INVENTORS
B. GROSS
J.C. YAGER

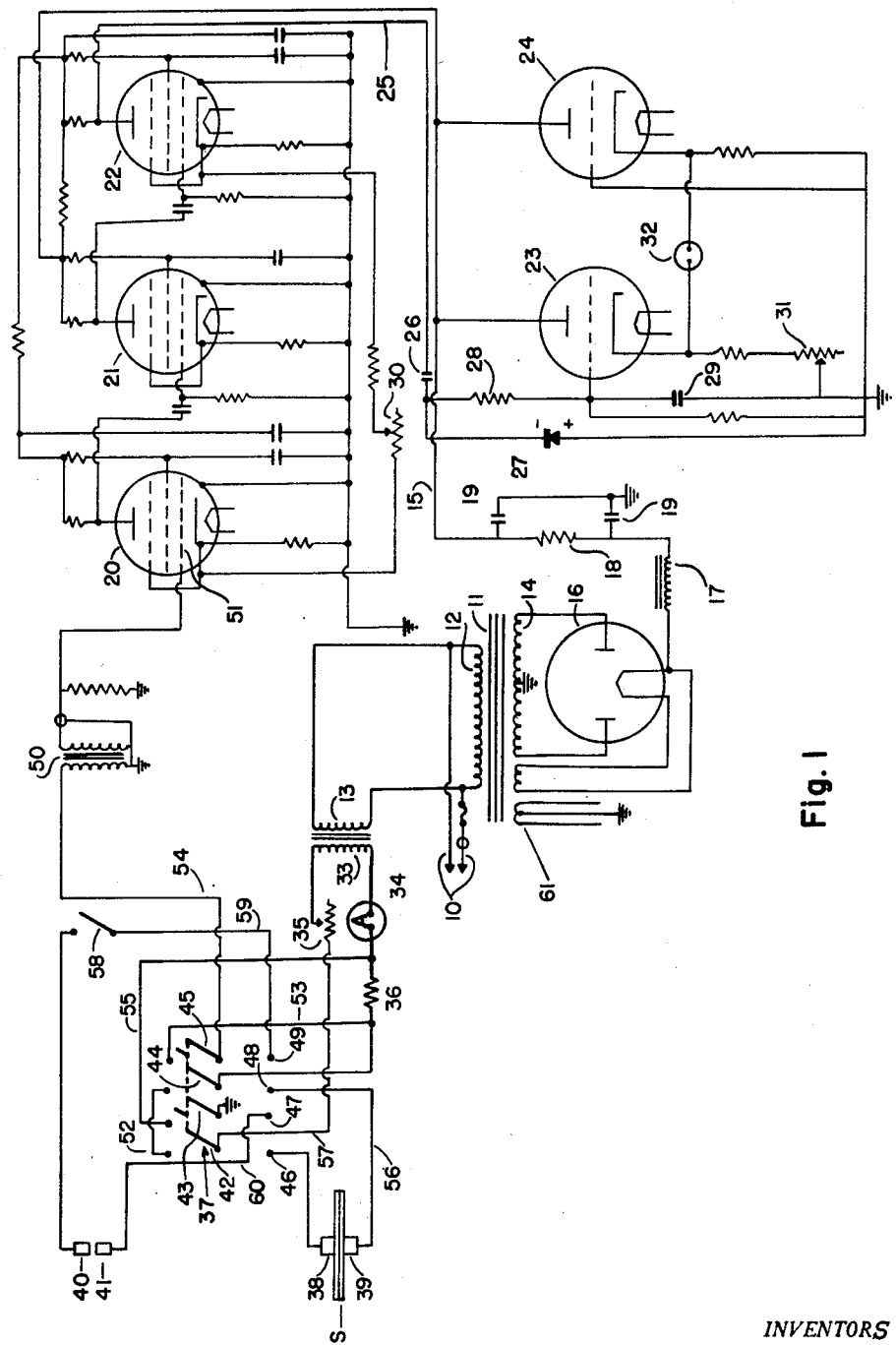
Fig. I
INVENTORS
B. GROSS
J.C. YAGER
By S. Tierney Jr.

United States Patent Office 2,778,995
Patented Jan. 22, 1957

2,778,995

ELECTRICAL TESTING INSTRUMENT

Bernard Gross, San Diego, and John C. Yager, National City, Calif., assignors to Rohr Aircraft Corporation, Chula Vista, Calif., a corporation of California Application August 24, 1953, Serial No. 375,943

7 Claims. (Cl. 324—64)

This invention relates to a machine and instrument for determining the surface condition of sheets of metal and more particularly the degree of cleanness of the surface of the sheets.

In spotwelding sheets of metal together on a production basis to form assemblies, the pressure used and electrical current passing during the welding operation depend among other things on the surface condition of the sheets being welded. This surface condition depends upon the presence or absence of a thin film of oil or grease which may have been used on the tools in which the part was shaped or machined or a film of foreign matter such as dust or other non-metallic particles often found floating in the air within a factory. It has been found in welding certain metals that even if the sheets are washed to remove the dirt films of the types mentioned, similar sheets will require substantially different welding pressures and currents in order to secure good welds of adequate strength. It has been found that a cause for this condition, especially in the case of sheets composed of alloys high in aluminum is the presence of a thin layer of an oxide of the metal on the surface of the sheets. This layer of oxide increases the resistance to the flow of welding current through the two sheets being welded and the increase in resistance depends upon the thickness of the layer. It is not possible therefore, to adequately weld together sheets having oxide layers of different thickness by using welding currents of the same value and it is time consuming and commercially undesirable to determine the thickness of the oxide layer and change the setting of the current control of the spot welding machine in accordance therewith.

According to this invention the formed parts to be welded together are washed in an acid solution which removes the oxide film as well as the film of oil, dust or other foreign matter from their surfaces. By pressing the cleaned part between two electrodes through which electric current is flowing, it is possible according to the invention to measure the electrical resistance of the part and determine if it is suitable for welding.

It is accordingly a purpose of the invention to provide an instrument adapted to apply a suitable pressure to the metal part to be welded and determine its electrical resistance.

A further object is to apply the pressure by means of a pair of current carrying electrodes which engage the upper and lower faces of the part and to determine the electrical resistance of the part by measuring the voltage between the upper and lower faces due to the passage of the current.

Another object is to provide a pair of measuring electrodes within and insulated from the current-carrying electrodes to engage the upper and lower surfaces of the part and to communicate their potential difference in amplified form to a pair of leads connected to an electrical meter calibrated in units of resistance. By merely noting the meter reading, the operator can quickly and easily determine the electrical resistance of the part and whether it is in condition for spot welding.

Further objects of the invention will become apparent as the description of the instrument proceeds. For a better understanding of the invention reference is made to the accompanying drawing, in which:

Figure 1 is a circuit diagram of the testing instrument,

Figure 3:
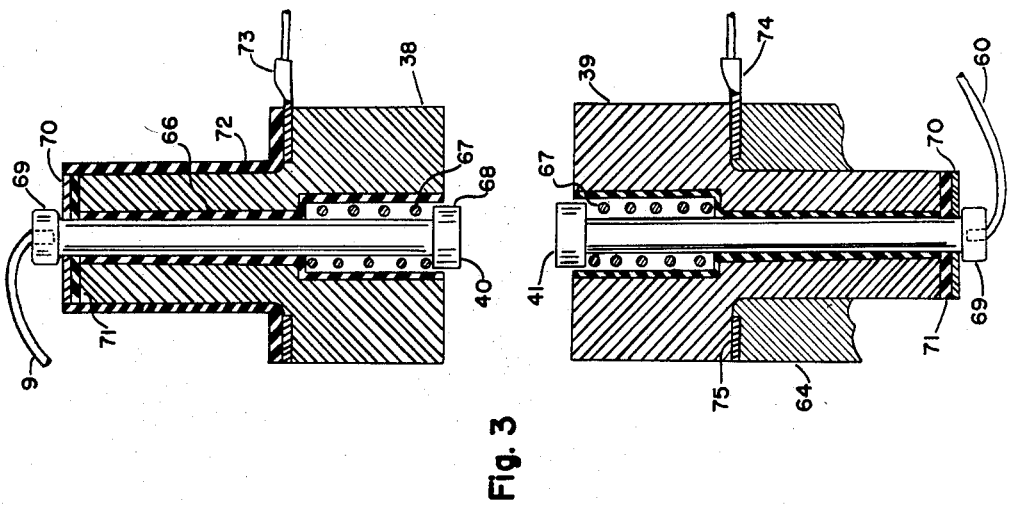
Figure 3 is an enlarged view partly in section of the electrodes of the press.

Referring to Figure 1, commercial 60 cycle current of 110 volts is supplied by leads 10 to transformer 11 having primary windings 12, 13 connected in series, winding 12 having a secondary 14 which supplies substantially steady direct current to lead 15 through full wave rectifier 16 and a filter including inductance coil 17, resistor 18 and condensers 19. Lead 15 supplies direct current of substantially constant voltage to the circuits of amplifier tubes 20, 21 and 22 which are resistance coupled in cascade as shown and to the plates of a pair of similar output tubes 23, 24. The output voltage of the tube 22 is applied by lead 25 and condenser 26 across a dry rectifier 27 across the terminals of which a resistor 28 and condenser 29 are connected in series. The cathodes of tubes 20 and 22 are connected by a circuit including a variable resistor 30 and the plate-cathode circuit of tube 23 contains a variable resistor 31 used for a purpose to be later described. A sensitive current measuring meter 32 having a scale graduated in microhms is connected across the cathodes of tubes 23–24.

Primary 13 supplies alternating current through secondary 33, ammeter 34, variable resistor 35, standard resistor 36 and switch 37 to upper and lower electrodes 38, 39 adapted to engage the workpiece S in a manner to be later described. In order to determine the voltage difference set up between the parts comprising the workpiece, the faces are engaged by a pair of metal contacts 40, 41 mounted within electrodes 38, 39 and insulated therefrom in a manner to be described later. Switch 37 has four blades 42, 43, 44, 45 which are normally held against lower contacts 46, 47, 48 and 49 by a spring (not shown).

Before testing sheets of metal, the instrument is first calibrated as follows: alternating current is supplied to leads 10 so that rectified current is supplied to the plates and screen grids of the several tubes. The heaters of the tubes are supplied with alternating current by leads, not shown for purpose of clarity, by transformer secondary 61. With no input voltage applied by input transformer 50 to the control grid 51 of tube 20, if tubes 23, 24 are not balanced so that meter 32 does not read zero, this balance is effected and the meter brought to zero by adjusting resistor 31. Switch 37 is then operated so that its blades 42 to 45 engage their upper contacts and complete the energizing circuit through secondary 33, ammeter 34, standard resistor 36, blade 44, lead 52, blade 42 and resistor 35. Resistor 35 is adjusted to give a current of 1.0 ampere through standard resistor 36 and the voltage developed across the ends of this resistor is impressed upon the input circuit of amplifier tube 20 by the circuit including lead 53, blade 45, lead 54 and transformer 50, the right hand end of resistor 36 being grounded by the circuit including lead 55 and switch blade 43. If at this time meter 32 does not read 50 microhms (the resistance of resistor 36), the contact of resistor 30 is adjusted to give a meter reading of 50 microhms.

The blades of switch 37 are then permitted to return to their normal position in contact with their lower contacts whereupon metal sheets S may be tested by inserting them between currents electrodes 38, 39 and applying a predetermined pressure to the sheet S by a press to be later described. Alternating current then passes from secondary winding 33 through the circuit including ammeter 34, resistor 36, switch blade 44, lead 56, contact 39, the sheets S, contact 38, blade 42, lead 57 and resistor 35. Resistor 35 is now adjusted to pass a current of 1.0 ampere through the sheets whereupon switch 58 is closed and the meter 32 read to obtain the resistance when the mating faces of the sheets are in contact. Probe contact 40 being in contact with the top sheet and contact 41 in contact with the lower sheet, the potential difference between the sheets is impressed on the input circuit of amplifier 20 through the circuit including the primary of transformer 50, lead 54, blade 45, lead 59, switch blade 58, lead 9, contact 40, contact 41, lead 60, blade 43 and ground. In spotwelding thin sheets of aluminum alloys having a thickness of the order of .028 to .125 inch it has been found that a contact resistance at the faces of the sheets of less than 50 microhms is necessary in order to secure desirable uniform welds with welding current of given amplitude.

After metal sheets to be welded into an assembly have been formed and machined to shape, it has been found that they are covered with not only oil or dust but also with an oxide film of aluminum or other metal which prevents their being spotwelded together to form a joint of maximum strength. By immersing the aluminum alloy sheets for a short time in an etching bath of 0.2 percent hydrofluoric acid; 0.2 percent nitric acid, balance water, the oxide film is removed along with the oil and dust or other foreign matter. Immediately after removal from the acid bath, the sheets are washed in a bath of water and dried. They are then ready for testing in the manner described.

Figure 2:
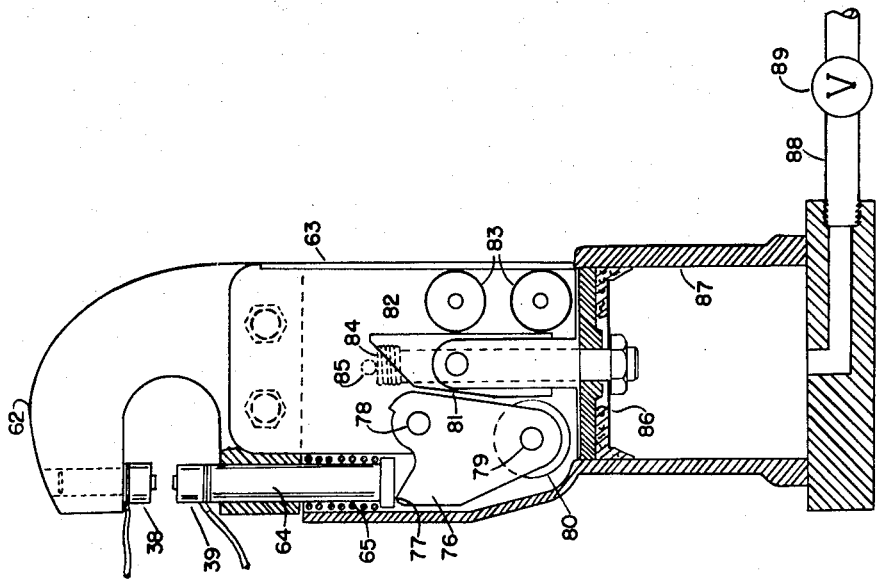
Figure 2 is a view partly in section through a press for applying pressure to a part to be welded.

Referring to Figs. 2 and 3, upper electrode 38 is stationary and is supported on the end of an overhanging arm 62 attached to the upper end of body 63 of the press. Lower electrode 39 is carried by a cylindrical plunger 64 which is biased downward by a coil spring 65. The upper and lower electrodes and contacts are of similar construction and each comprises an insulating sleeve 66 having a shoulder against which the end of a helical compression spring 67 is seated. The spring normally maintains the cylindrical head 68 of the contact extended a small distance past the flat face of electrode 38 or 39, the opposite end of the contact having an enlarged head 69 which seats against a metal washer 70. Washer 70 seats against an insulating washer 71 and upper electrode 38 is insulated from arm 62 by an insulating bushing 72 whose lower end bears against a terminal 73 connected to the end of the wire supplying the alternating current. A similar terminal 74 connected to the end of current supply wire is seated between a shoulder 75 on electrode 39 and the top of plunger 64. The ends of leads 9 and 60 are connected to head 69 by soldering or other suitable means.

Plunger 64 is raised by a cam follower 76 having a rise 77 which bears against the lower end of the plunger, the follower being pivoted on pin 78 and carrying on pin 79 a roller 80 which rests against the face of a cam 81 formed on block 82. The opposite face of the block is straight and runs along pivoted rollers 83. Block 82 is biased by a compression spring 84 whose upper end is seated against and secured to a stop 85. Block 82 is secured to the top of a piston 86 sidable in a pneumatic cylinder 87 formed in pressbody 63. Compressed air is admitted to the bottom of the cylinder from a conduit 88 under the control of valve 89, the conduit being connected to a source of compressed air (not shown).

With valve 89 closed and piston 86 in its lowest position, electrode 39 is maintained down by spring 65 so that two sheets to be tested may be inserted between electrodes 38—39. Upon opening valve 99, the air admitted under piston 86 causes it to rise and cam 81 riding along roller 80 causes cam follower 76 to raise plunger 64 and electrode 39 to press the top sheet against electrode 38. Springs 67 are simultaneously compressed and maintain probe contacts 40, 41 in good contact with the sheets so that the potential difference between the sheets may be measured by the meter and circuit above described. Upon closing valve 89 the air under piston 86 bleeds out through a small opening in the valve (not shown) and spring 84 returns block 82 and the piston to their initial positions.

Electrodes 38—39 and contacts 40, 41 are preferably made of copper or copper alloy of high electrical conductivity to minimize their contact resistance with the sheets and by making electrodes 38, 39 of a diameter of one-half inch and using an air pressure of 50 p. s. i., it is possible to secure a substantially uniform pressure on the sheets of the order of 1,000 p. s. i. Uniformity of results may be secured with the apparatus and circuits described when tests on the same sheets are repeated.

We claim:

1. An instrument for determining the suitability of a metal part for spotwelding comprising in combination: two hollow electrodes having aligned openings therethrough and adjacent flat faces of large area; means responsive to fluid pressure for compressing the part between said flat faces; means connected to said electrodes to supply electrical current of predetermined amplitude thereto; sleeves composed of insulating material within said openings; metal plungers within said sleeves and having opposed flat faces in contact with the part; and a meter having its terminals connected to said plungers and responsive to variations in voltage thereof.

2. An instrument as claimed in claim 1; in which said meter has a scale graduated in microhms.

3. An instrument for determining the suitability of a metal part for spotwelding comprising, in combination: upper and lower hollow electrodes having aligned vertical openings therethrough and adjacent horizontal faces of large area; insulation sleeves within said openings; metal plungers within said sleeves and having opposed flat faces; springs within said insulation sleeves arranged to normally maintain the faces of the plungers extended beyond the horizontal faces of said electrodes; means responsive to fluid under steady pressure for raising said lower electrode against the part to compress said springs and the part; a current source connected to said electrodes to supply current of predetermined amplitude thereto; a vacuum tube amplifier having its input connected to said plungers; a rectifier connected to the output of said amplifier; and an ohmmeter responsive to the rectified current.

4. An instrument for determining the suitability of a metal part for spotwelding comprising, in combination: a standard resistor; an ammeter; a transformer winding; a variable resistor; a circuit connecting said circuit components in series; said variable resistor being adjusted to provide a current of predetermined value through said standard resistor; an ohmmeter; a calibrating circuit including a movable switch connecting the ends of said standard resistor to said ohmmeter, said calibrating circuit including an adjustable resistor arranged to cause the reading of the ohmmeter to correspond with the resistance of the standard resistor; a pair of current carrying electrodes engaging the opposite faces of the part; and a circuit including said switch arranged to cause the ohmmeter to indicate the resistance between the opposite faces of the part.

5. An instrument for determining the suitability of a metal part for spotwelding comprising, in combination: means for causing an alternating current to flow between the opposite faces of the part; a vacuum tube amplifier having an input grid circuit and an output plate circuit; means electrically connecting said opposite faces to said grid circuit; a pair of normally balanced vacuum tubes having plates, cathodes and control grids; a source of direct current having its positive terminal connected to said plates and its negative terminal to said cathodes; a current responsive meter; a pair of leads connecting the terminals of said meter to said cathodes; a rectifier connected to the plate circuit of said amplifier; and means whereby the rectified current passing through said rectifier changes the potential of the control grid of one of said normally balanced tubes to cause the passage of current through said meter.

6. An instrument as claimed in claim 5; in which said meter has a scale graduated in microhms and the potential of the control grid of said one balanced tube is changed by an amount sufficient to cause said meter to indicate the resistance between the opposite faces of the part.

7. An instrument for determining the resistance between the opposite faces of a metal sheet comprising, in combination: a stationary hollow metal electrode; a movable electrode within said hollow electrode; insulation interposed between said hollow and movable electrodes; a spring arranged to normally maintain the bottom of said movable electrode below the bottom of said hollow electrode; a movable hollow electrode; means supporting said last named electrode for vertical movement in alignment with said stationary electrode; a fourth electrode; insulation supporting said fourth electrode for vertical movement within said movable hollow electrode; a spring arranged to normally maintain the top of said fourth electrode above the top of said movable hollow electrode; a cam mounted for rectilinear movement; pressurized fluid operated means for moving said cam; a pivoted lever actuated by said cam and having a projecting portion in contact with the bottom of said movable hollow electrode; a current source connected to said stationary hollow electrode and said movable hollow electrode to supply electric current of predetermined amplitude thereto; and an ohmmeter electrically connected to said movable electrode and said fourth electrode, said ohmmeter having a scale graduated in microhms.

References Cited in the file of this patent

UNITED STATES PATENTS

| | | |
|---|---|---|
| 2,088,843 | Davies | Aug. 3, 1937 |
| 2,142,619 | Sciaky | Jan. 3, 1939 |
| 2,370,009 | Clark et al. | Feb. 20, 1945 |
| 2,371,636 | McConnell | Mar. 20, 1945 |
| 2,401,917 | Drake | June 11, 1946 |
| 2,451,613 | Darby et al. | Oct. 19, 1948 |
| 2,457,669 | Hart | Dec. 28, 1948 |

OTHER REFERENCES

Iron Age, August 16, 1945, pp. 74 and 146.